(12) United States Patent
Green et al.

(10) Patent No.: US 7,079,630 B2
(45) Date of Patent: Jul. 18, 2006

(54) VOICEMAIL SYSTEM COMPONENT EMPLOYMENT OF INTERNET PROTOCOL NETWORK TO STORE OR ACCESS ONE OR MORE VOICEMAIL MESSAGES ON ONE OR MORE STORAGE DEVICES

(75) Inventors: Merle Leland Green, Plainfield, IL (US); Theodore Edward Kraft, Downers Grove, IL (US); Alton David Patterson, Aurora, IL (US); David Alan Roberson, Bolingbrook, IL (US); Paul Raymond Sand, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/099,874

(22) Filed: Mar. 15, 2002

(65) Prior Publication Data

US 2003/0174816 A1    Sep. 18, 2003

(51) Int. Cl.
*H04M 1/64* (2006.01)

(52) U.S. Cl. .............................. 379/88.17; 379/88.25; 379/88.27

(58) Field of Classification Search .................. 379/68, 379/88.17, 88.18, 88.25, 88.27, 88.13, 220.01
See application file for complete search history.

(56) References Cited

U.S. PATENT DOCUMENTS

| | | | | |
|---|---|---|---|---|
| 5,608,786 A | * | 3/1997 | Gordon | 370/352 |
| 5,659,599 A | * | 8/1997 | Arumainayagam et al. | 379/67.1 |
| 5,751,792 A | * | 5/1998 | Chau et al. | 379/88.17 |
| 5,909,483 A | * | 6/1999 | Weare et al. | 379/88.18 |
| 5,943,402 A | * | 8/1999 | Hamel et al. | 379/88.26 |
| 5,963,618 A | * | 10/1999 | Porter | 704/270.1 |
| 5,995,596 A | * | 11/1999 | Shaffer et al. | 379/88.18 |
| 6,181,780 B1 | * | 1/2001 | Finnigan | 379/67.1 |
| 6,233,318 B1 | * | 5/2001 | Picard et al. | 379/88.17 |
| 6,282,270 B1 | * | 8/2001 | Porter | 379/88.17 |
| 6,396,908 B1 | * | 5/2002 | O'Donovan et al. | 379/88.18 |
| 6,519,327 B1 | * | 2/2003 | Cannon et al. | 379/88.22 |
| 6,874,018 B1 | * | 3/2005 | Wu | 709/219 |
| 2004/0267610 A1 | * | 12/2004 | Gossett et al. | 705/14 |

OTHER PUBLICATIONS

"HLR"; http://www.techweb.com/encyclopedia/defineterm?term=HLR; TechEncyclopedia; Computer Language Company, 5521 State Park Road, Point Pleasant, PA 18950; 1 pg.; Mar. 12, 2002.

"SS7"; http://www.techweb.com/encyclopedia/defineterm.yb?term=SS7; TechEncyclopedia; Computer Language Company, 5521 State Park Road, Point Pleasant, PA 18950; 3 pgs.; Mar. 12, 2002.

"SCP"; http://www.techweb.com/encyclopedia/defineterm?term=SCP; TechEncyclopedia; Computer Language Company, 5521 State Park Road, Point Pleasant, PA 18950; 1 pg.; Mar. 12, 2002.

(Continued)

*Primary Examiner*—Fan Tsang
*Assistant Examiner*—Simon Sing

(57) ABSTRACT

One or more voicemail system components of an apparatus in one example employ an internet protocol network to store or access one or more voicemail messages on one or more storage devices. The one or more voicemail system components are coupled with the one or more storage devices through the internet protocol network.

29 Claims, 11 Drawing Sheets

OTHER PUBLICATIONS

"PSTN"; http://www.techweb.com/encyclopedia/defineterm?term=pstn; TechEncyclopedia; Computer Language Company, 5521 State Park Road, Point Pleasant, PA 18950; 1 pg.; Mar. 12, 2001.

"TCP/IP"; http://www.techweb.com/encyclopedia/defineterm?term=tcp%2Fip; TechEncyclopedia; Computer Language Company, 5521 State Park Road, Point Pleasant, PA 18950; 1 pg.; Mar. 12, 2002.

"NODE"; http://www.techweb.com/encyclopedia/defineterm?term=node; TechEncyclopedia; Computer Language Company, 5521 State Park Road, Point Pleasant, PA 18950; 1 pg.; Mar. 13, 2002.

"Internet"; http://www.techweb.com/encyclopedia/defineterm.yb?term=internet&FormInfo=CMP-Tech; TechEncyclopedia; Computer Language Company, 5521 State Park Road, Point Pleasant, PA 18950; 3 pgs.; Mar. 13, 2002.

"Intranet"; http://www.techweb.com/encyclopedia/defineterm.yb?term=intranet; TechEncyclopedia; Computer Language Company, 5521 State Park Road, Point Pleasant, PA 18950; 1 pg.; Mar. 13, 2002.

"IP"; http://www.techweb.com/encyclopedia/defineterm?term=ip; TechEncyclopedia; Computer Language Company, 5521 State Park Road, Point Pleasant, PA 18950; 1 pg.; Mar. 13, 2002.

"Profile"; http://www.dictionary.com/search?q=profile; Lexico, LLC; Lexico, LLC, 13428 Maxella Avenue #236, Marina del Rey, CA 90292; 6 pgs.; Mar. 13, 2002.

* cited by examiner

BROADCAST A MESSAGE — 202      100

117

402 A SUBSCRIBER DIALS INTO A VOICE MAIL SYSTEM AND LOGS INTO THE VOICE MAIL SYSTEM.

404 THE SUBSCRIBER RECORDS A MESSAGE (M3). THE MESSAGE IS STORED ON A FILE SERVER (FILE SERVER 3)

406 THE SUBSCRIBER ELECTS TO BROADCAST THE MESSAGE TO MORE THAN ONE VOICE MAIL BOX AND INCLUDES Mb 1,1 AND Mb 2,1 IN THE BROADCAST LIST.

408 THE FILE SERVER (FILE SERVER 3) STORES THE MESSAGE (M3) AND LINKS IT TO mb 1,1,3 IN A VOICE MAIL BOX (Mb 1,1) ON A VOICE MAIL SYSTEM (VMS1) AND mb 2,1,2 IN A VOICE MAIL BOX (Mb 2,1) ON A VOICE MAIL SYSTEM (VMS2). THE VOICE MAIL SERVER (VMS2) CREATES AN ENTRY (mb 2,1,2) FOR THE MAILBOX (Mb 2,1) THAT POINTS TO THE MESSAGE (M3). THE VOICE MAIL SERVER (VMS1) CREATES AN ENTRY (mb 1,1,3) FOR THE MAILBOX (Mb 1,1) THAT POINTS TO THE MESSAGE (M3).

410 THE SUBSCRIBER TERMINATES THE SESSION WITH THE VOICE MAIL SYSTEM.

117⟍ EDIT A MESSAGE ／202    100

502 THE SUBSCRIBER REALIZES THAT INFORMATION BROADCAST IN A PREVIOUS MESSAGE IS INCORRECT.

504 THE SUBSCRIBER ACCESSES THEIR VOICE MAIL SYSTEM AND RETRIEVES THE BROADCAST MESSAGE (M3). THE MESSAGE IS MODIFIED AND STORED ON A FILE SERVER (FILE SERVER 3).

506 NOW THE CONTENT OF THE CHANGED MESSAGE (M3) "PROPAGATES" TO ALL VOICE MAIL BOXES (Mb 1,1 AND Mb 2,1) TO WHICH IT WAS PREVIOUSLY BROADCAST. IF THE MESSAGE HAD BEEN PREVIOUSLY LISTENED TO BY THE SUBSCRIBER OWNING THE VOICE MAIL BOX, THE MODIFIED MESSAGE IS MARKED AS NEW IN THE RESPECTIVE VOICE MAIL BOX.

508 THE SUBSCRIBER TERMINATES THE SESSION WITH THE VOICE MAIL SYSTEM.

FIG. 5    500

DELETE A MESSAGE

600 SUBSCRIBER (DN2) DIALS INTO THE VOICE MAIL SYSTEM (VMS1) AND LOGS INTO THE VOICE MAIL SYSTEM (VMS1).

602 THE SUBSCRIBER (DN2) IS NOTIFIED THAT THERE ARE 2 MESSAGES IN THE MAILBOX (Mb 1,1) (MESSAGE M1 AND MESSAGE M2 FROM THE PREVIOUS EXAMPLE).

604 THE SUBSCRIBER (DN2) SKIPS THE FIRST MESSAGE (M1) AND SELECTS THE NEXT MESSAGE (M2).

606 THE VOICE MAIL SYSTEM (VMS1) RETRIEVES THE MESSAGE FROM THE FILE SERVER (FILE SERVER 2) AND PLAYS THE MESSAGE (M2).

608 THE SUBSCRIBER (DN2) ELECTS TO DELETE THE MESSAGE (M2) FROM THEIR MAILBOX (Mb 1,1) ON VOICE MAIL SYSTEM (VMS1).

610 THE FILE SERVER (FILE SERVER 2) REMOVES THE LINK mb 1,1,2 FROM THE MESSAGE (M2). mb 1,1,2 IS REMOVED FROM THE VOICE MAIL BOX (Mb 1,1) EFFECTIVELY DELETING THE MESSAGE FROM THE VOICE MAILBOX (Mb 1,1). THE MESSAGE (M2) STILL REMAINS INTACT ON THE FILE SERVER (FILE SERVER 2) AND REMAINS LINKED TO ANOTHER MAILBOX (Mb 2,1) ON ANOTHER VOICE MAIL SYSTEM (VMS2).

612 THE SUBSCRIBER (DN2) TERMINATES THE SESSION WITH THE VOICE MAIL SYSTEM (VMS1).

614 SUBSCRIBER (DN1) DIALS INTO THE VOICE MAIL SYSTEM (VMS2) AND LOGS INTO THE VOICE MAIL SYSTEM (VMS2).

616 THE SUBSCRIBER (DN1) IS NOTIFIED THAT THERE ARE 2 MESSAGES IN THE MAILBOX (Mb 2,1) (MESSAGE M2 AND MESSAGE M3).

618 THE SUBSCRIBER (DN1) SELECTS THE FIRST MESSAGE (M2) AND LISTENS TO IT.

620 THE SUBSCRIBER (DN1) ELECTS TO DELETE THE MESSAGE (M2) FROM THEIR MAILBOX (Mb 2, 1) ON VOICE MAIL SYSTEM (VMS2).

622 THE FILE SERVER (FILE SERVER 2) REMOVES THE LINK mb 2,1,1 FROM THE MESSAGE (M2) AND DELETES THE MESSAGE (M2). mb 2,1,1 IS REMOVED FROM THE VOICE MAIL BOX (Mb 2,1) EFFECTIVELY DELETING THE MESSAGE FROM THE VOICE MAILBOX (Mb 2,1) ON THE VOICE MAIL SYSTEM (VMS2). THE MESSAGE (M2) IS NOW COMPLETELY DELETED FROM THE NETWORK.

624 THE SUBSCRIBER (DN1) TERMINATES THE SESSION WITH THE VOICE MAIL SYSTEM (VMS2).

FIG. 6

MOVE A MAILBOX 100

107

204

702 AN ADMINISTRATOR ELECTS TO MOVE A VOICE MAILBOX (Mb 1,1) FROM A VOICE MAIL SYSTEM (VMS1) TO LOAD BALANCE TWO VOICE MAIL SYSTEMS (VMS1 AND VMS2).

704 THE VOICE MAILBOX (Mb 1,1) IS MOVED FROM ONE VOICE MAIL SYSTEM (VMS1) TO THE OTHER (VMS2) BY MOVING THE LINKED LIST OF mb 1,1,1 AND mb 1,1,2 AND mb 1,1,3 TO THE DESTINATION VOICE MAIL SYSTEM (VMS2). ADDITIONALLY, STORED GREETINGS AND DISTRIBUTION LISTS ARE MOVED TO THE DESTINATION VOICE MAIL SYSTEM AS WELL (VMS2) FOR THE MOVED VOICE MAILBOX.

706 THE DESTINATION VOICE MAIL SYSTEM CREATES A NEW VOICE MAIL BOX (Mb 2,2) AND RENAMES mb 1,1,1 AND mb 1,1,2 AND mb 1,1,3 TO mb 2,2,1 AND mb 2,2,2 AND mb 2,2,3 RESPECTIVELY.

708 THE FILE SERVERS (FILE SERVER 1, FILE SERVER 2, AND FILE SERVER 3) ARE INSTRUCTED TO RENAME AND RELINK mb 1,1,1 AND mb 1,1,2 AND mb 1,1,3 TO mb 2,2,1 AND mb 2,2,2 AND mb 2,2,3 RESPECTIVELY.

710 THE MAILBOX MOVE IS COMPLETE.

WIRELESS NETWORK — 100

117 —

902 A WIRELESS SUBSCRIBER REGISTERS ON A WIRELESS NETWORK. 807

904 THE WIRELESS NETWORK CHECKS ITS HLR DATABASE TO DETERMINE IF THE SUBSCRIBER'S HANDSET IS REGISTERED TO THIS NETWORK.

906 IF THE HANDSET IS REGISTERED TO THIS NETWORK SKIP TO STEP 912.

908 IF THE HANDSET IS NOT REGISTERED TO THIS NETWORK THIS IS A SUBSCRIBER STARTING TO ROAM IN THIS NETWORK AND COOPERATING NETWORKS ARE QUERIED TO DETERMINE THE SUBSCRIBER'S HOME NETWORK.

910 THE COOPERATING WIRELESS NETWORK WITH WHICH THE SUBSCRIBER'S HANDSET IS REGISTERED RESPONDS TO THIS NETWORK AND PROVIDES A SET OF INFORMATION TO THIS NETWORK FROM THE HLR STORED IN THE HOME NETWORK. THIS INFORMATION IS KNOWN AS THE VLR.

912 SUCCESSFUL REGISTRATION USING THE HLR OR VLR TRIGGERS AN EVENT REPORT TO THE SCP IN THIS NETWORK. THE SCP IS INFORMED OF THE ADDRESS OF THE SUBSCRIBER'S VOICE MESSAGING SYSTEM. THE SCP CHECKS TO SEE IF THE PRESENT LOCATION OF THE VOICE MESSAGING SYSTEM IS OPTIMAL.

914 IF THE VOICE MESSAGING SYSTEM IS LOCATED IN AN OPTIMAL LOCATION, THEN SKIP TO STEP 918.
— 922

916 IF THE VOICE MESSAGING SYSTEM IS LOCATED IN A NON-OPTIMAL LOCATION AS DETERMINED BY THE SCP, THE SCP INSTRUCTS THE CURRENT VOICE MESSAGING SYSTEM TO TRANSFER THE SUBSCRIBER'S MAILBOX INFORMATION (NOT MAILBOX MESSAGE CONTENT) TO A MORE SUITABLE VOICE MAIL SYSTEM. THE SCP INSTRUCTS THE HOME WIRELESS NETWORK TO UPDATE THE HLR RECORD TO INCLUDE THE NEW VOICE MESSAGING SYSTEM LOCATION. THE INFORMATION MOVED IS GREETINGS, DISTRIBUTION LISTS, THE LIST OF ADDRESSES OF MESSAGES IN THE MAILBOX AND OPTIONAL MAILBOX SETTINGS. VOICE MESSAGES REMAIN STORED IN THEIR ORIGINAL FILE SERVER.
— 920

918 THE WIRELESS NETWORK IS NOW CONFIGURED TO HANDLE THIS SUBSCRIBER AND DELIVER UNANSWERED CALLS TO THE PROPER VOICE MESSAGING SYSTEM.
— 900

WIRELESS NETWORK — 807 — 117    100

1002 NOW A CALL ARRIVES FOR THE SUBSCRIBER.

1004 THE SUBSCRIBER IS CURRENTLY ON A CALL, DOES NOT ANSWER IN A DETERMINED NUMBER OF RINGS, OR THE SUBSCRIBER IS PRESENTLY MARKED AS "DO NOT DISTURB".

1006 THE SCP RECEIVES NOTIFICATION OF THE EVENT IN 1004 CAUSING THE CALL TO BE UNANSWERED.

1008 THE SCP DIRECTS THE CALL TO THE PREVIOUSLY DETERMINED AND CONFIGURED VOICE MESSAGING SYSTEM.

1010 THE VOICE MESSAGING SYSTEM RECEIVES THE CALL FOR THE SUBSCRIBER'S MAILBOX, PLAYS THE SUBSCRIBER'S GREETING AND RECORDS A VOICE MESSAGE FROM THE CALLER.

1012 OPTIONALLY, A NOTIFICATION IS SENT TO THE SUBSCRIBER INFORMING THE SUBSCRIBER THAT A MESSAGE HAS BEEN LEFT IN THE SUBSCRIBER'S VOICE MAILBOX.

1014 WHEN CONVENIENT, THE SUBSCRIBER DIALS INTO THE SUBSCRIBER'S VOICE MESSAGING SYSTEM SUCH AS BY DIALING THE SUBSCRIBER'S OWN TELEPHONE NUMBER.

1016 THE SCP IS NOTIFIED WHEN THE SUBSCRIBER PLACES A CALL TO THE SUBSCRIBER'S SELF AND ROUTES THE CALL TO THE SUBSCRIBER'S VOICE MESSAGING SYSTEM.

1018 THE VOICE MESSAGING SYSTEM RECOGNIZES THIS AS A CALL FROM THE MAILBOX OWNER AND PROMPTS FOR A PASSWORD.

1020 THE SUBSCRIBER ENTERS THE CORRECT PASSWORD

1022 THE VOICE MAIL SYSTEM PLAYS THE MESSAGE DEPOSITED IN THE VOICE MAILBOX.

1024 IF THE SUBSCRIBER WISHES TO PLAY PREVIOUSLY LEFT MESSAGES THOSE ARE ALSO ACCESSIBLE NO MATTER WHERE THEY WERE STORED.

1026 NOW THE ROAMING SUBSCRIBER RETURNS TO THE SUBSCRIBER'S HOME NETWORK. EMPLOYMENT OF ONE OR MORE PORTIONS OF EXEMPLARY LOGIC 900 OF FIG. 9 SERVES TO EFFECTIVELY MOVE THE SUBSCRIBER'S MAILBOX BACK TO THE SUBSCRIBER'S OWN HOME NETWORK.

WIRELINE NETWORK — 803, 117

1102 NOW A CALL ARRIVES FOR THE SUBSCRIBER.

1104 THE SUBSCRIBER IS CURRENTLY ON A CALL, DOES NOT ANSWER IN A DETERMINED NUMBER OF RINGS, OR THE SUBSCRIBER IS PRESENTLY MARKED AS "DO NOT DISTURB".

1106 THE SCP RECEIVES NOTIFICATION OF THE EVENT IN 1104 CAUSING THE CALL TO BE UNANSWERED.

1108 THE SCP CHECKS THE SUBSCRIBER'S ASSIGNED VOICE MESSAGING SYSTEM. IF THE VOICE MESSAGING SYSTEM IS CURRENTLY EXPECTED TO PROVIDE SATISFACTORY PERFORMANCE SKIP TO STEP 1112. ELSE CONTINUE WITH 1110.

1110 THE SCP ASKS THE CURRENTLY ASSIGNED VOICE MESSAGING SYSTEM TO TRANSFER THE SUBSCRIBER'S MAILBOX INFORMATION TO A NEWLY SELECTED VOICE MESSAGING SYSTEM.

1112 THE SCP DIRECTS THE CALL TO THE APPROPRIATE VOICE MESSAGING SYSTEM.

1114 THE VOICE MESSAGING SYSTEM RECEIVES THE CALL FOR THE SUBSCRIBER'S MAILBOX, PLAYS THE SUBSCRIBER'S GREETING AND RECORDS A VOICE MESSAGE FROM THE CALLER.

1116 OPTIONALLY, A NOTIFICATION IS SENT TO THE SUBSCRIBER INFORMING THE SUBSCRIBER THAT A MESSAGE HAS BEEN LEFT IN THE SUBSCRIBER'S VOICE MAILBOX.

1118 WHEN CONVENIENT, THE SUBSCRIBER DIALS INTO THE SUBSCRIBER'S VOICE MESSAGING SYSTEM SUCH AS BY DIALING THE SUBSCRIBER'S OWN TELEPHONE NUMBER.

1120 THE SCP IS NOTIFIED WHEN THE SUBSCRIBER PLACES A CALL TO THE SUBSCRIBER'S SELF AND ROUTES THE CALL TO THE SUBSCRIBER'S VOICE MESSAGING SYSTEM.

1122 THE VOICE MESSAGING SYSTEM RECOGNIZES THIS AS A CALL FROM THE MAILBOX OWNER AND PROMPTS FOR A PASSWORD.

1124 THE SUBSCRIBER ENTERS THE CORRECT PASSWORD.

1126 THE VOICE MAIL SYSTEM PLAYS THE MESSAGE DEPOSITED IN THE VOICE MAILBOX.

1128 IF THE SUBSCRIBER WISHES TO PLAY PREVIOUSLY LEFT MESSAGES THOSE ARE ALSO ACCESSIBLE NO MATTER WHERE THEY WERE STORED.

FIG. 11           1100

VOICEMAIL SYSTEM COMPONENT EMPLOYMENT OF INTERNET PROTOCOL NETWORK TO STORE OR ACCESS ONE OR MORE VOICEMAIL MESSAGES ON ONE OR MORE STORAGE DEVICES

CROSS-REFERENCE TO RELATED APPLICATION

This application relates to co-filed, commonly-owned U.S. patent application Ser. No. 10/099,877, entitled "MAILBOX PROFILE PORTION COPYING AMONG VOICEMAIL SYSTEM COMPONENTS OF NETWORKS"), which is hereby incorporated herein by reference in its entirety.

TECHNICAL FIELD

The invention in one example relates generally to communications and more particularly to voicemail.

BACKGROUND

In one example of a communication system, a first user places a call to a second user. Should the second user be unavailable to take the call, the communication system in one example allows the first user to leave a voice message in a voice mailbox that the communication system provides for the second user.

The communication system in one example employs a voicemail system to store the voice mailbox as well as the voice messages associated therewith. In a further example, the same voicemail system or other voicemail systems serve to store additional voice mailboxes and the voice messages associated therewith.

Forwarding of a voicemail message from a first voice mailbox to one or more additional voice mailboxes in one example involves writing of the voicemail message from the first voice mailbox to each of the one or more additional voice mailboxes. Moving of a voice mailbox from a first location to a second location in one example involves writing of the voice mailbox and the voice messages associated therewith from the first location to the second location.

SUMMARY

The invention in one embodiment encompasses an apparatus. The apparatus includes one or more voicemail system components that employ an internet protocol network to store or access one or more voicemail messages on one or more storage devices. The one or more voicemail system components are coupled with the one or more storage devices through the internet protocol network.

Another embodiment of the invention encompasses a method. An address of a voicemail message is copied on a second voice mailbox, on a second voicemail system component, from a first voice mailbox, on a first voicemail system component, to move an association with a user from the first voice mailbox to the second voice mailbox.

A further embodiment of the invention encompasses an article. The article includes a computer-readable signal-bearing medium. The article includes means in the medium for copying an address of a voicemail message on a second voice mailbox, on a second voicemail system component, from a first voice mailbox, on a first voicemail system component, to move an association with a user from the first voice mailbox to the second voice mailbox.

DESCRIPTION OF THE DRAWINGS

Features of exemplary implementations of the invention will become apparent from the description, the claims, and the accompanying drawings in which:

FIG. 4 represents one example of logic that is employable in the apparatus of FIG. 1.

FIG. 5 represents another example of logic that is employable in the apparatus of FIG. 1.

FIG. 6 represents yet another example of logic that is employable in the apparatus of FIG. 1.

FIG. 7 represents a further example of logic that is employable in the apparatus of FIG. 1.

FIG. 9 represents one example of logic that is employable in the apparatus of FIG. 8.

FIG. 10 represents another example of logic that is employable in the apparatus of FIG. 8.

FIG. 11 represents yet another example of logic that is employable in the apparatus of FIG. 8.

DETAILED DESCRIPTION

Figure 1:
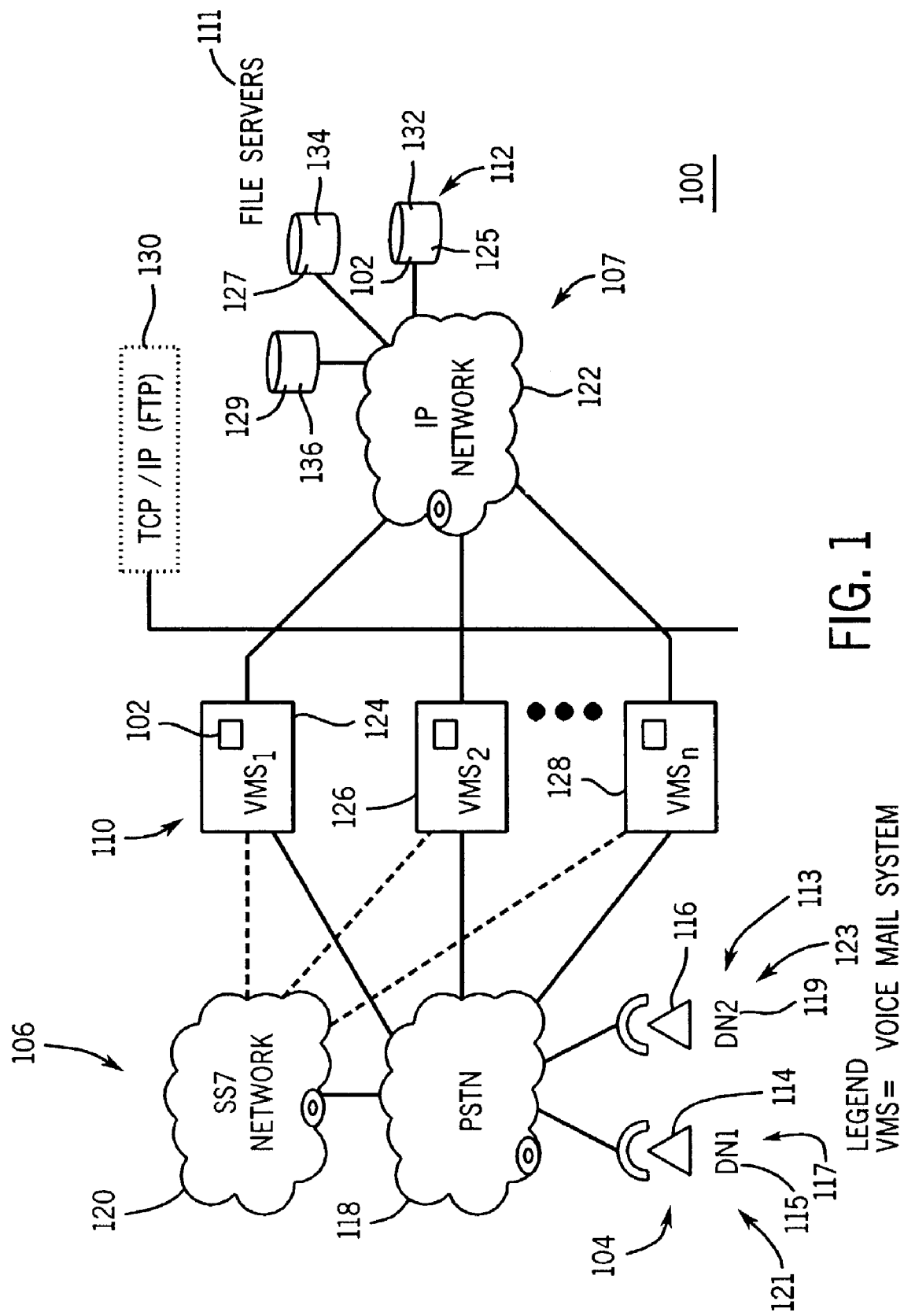
FIG. 1 is a representation of one exemplary implementation of an apparatus that comprises one or more phones, one or more networks, one or more voicemail system components, and one or more storage devices.

Turning to FIG. 1, an apparatus 100 in one example comprises one or more voicemail system components that employ an internet protocol network to store or access one or more voicemail messages on one or more storage devices. The one or more voicemail system components are coupled with the one or more storage devices through the internet protocol network. A portion of a component of the apparatus 100 in one example comprises all of the component, and in another example comprises a subportion of the component, where the subportion of the component comprises less than all of the component.

Figure 8:
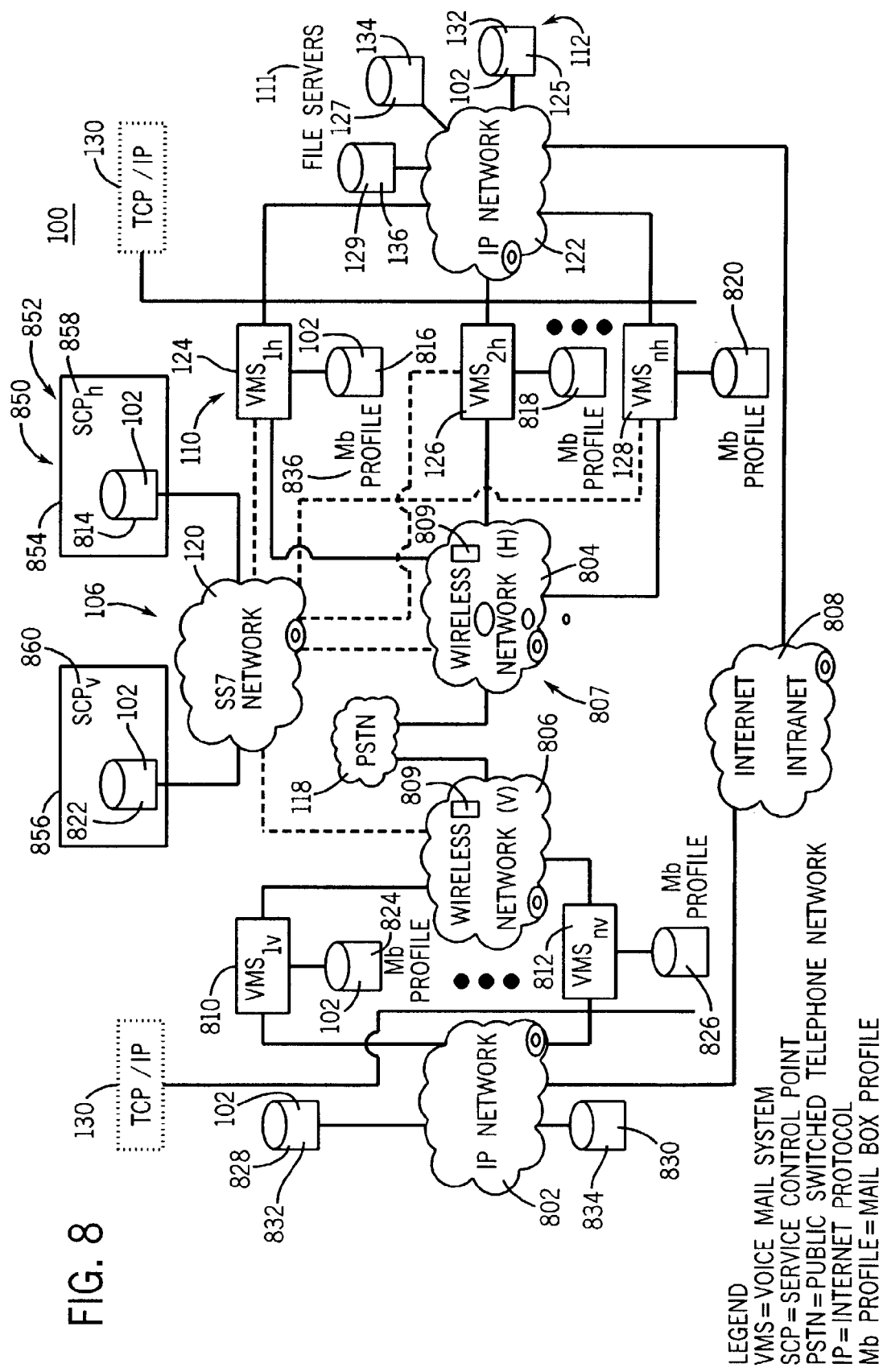
FIG. 8 is a representation of exemplary additional implementation details of the apparatus of FIG. 1.

Referring further to FIGS. 1 and 8, the apparatus 100 in one example employs at least one computer-readable signal-bearing medium. One example of a computer-readable signal-bearing medium for the apparatus 100 comprises an instance of a recordable data storage medium 102 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

Still referring to FIGS. 1 and 8, in one example, the apparatus 100 comprises one or more phones 104, one or more networks 106, one or more voicemail system ("VMS") components 110, one or more storage devices 112, and one or more node components 850. The phone 104 in one example corresponds to a destination number ("DN") 113, for example, a telephone number. Exemplary instances of the phone 104 comprise phones 114 and 116. Exemplary instances of the destination number 113 comprise destination numbers 115 and 119. The phone 114 in one example corresponds to the destination number 115 and/or one or more users 117, for example, a user 121. The phone 116 in one example corresponds to the destination number 119 and/or one or more of the users 117, for example, a user 123. The user 117 in one example comprises a subscriber. For example, the user 117 comprises a wireless and/or wireline subscriber. In another example, referring to FIGS. 1–2 and 8, the user 117 comprises an owner of a voicemail message 202. In a further example, the user 117 comprises an intended recipient of the voicemail message 202, as will be appreciated by those skilled in the art.

Referring again to FIGS. 1 and 8, exemplary instances of the network 106 comprise networks 118, 120, 122, 802, 804, 806, and 808. The network 118 in one example comprises a public switched telephone network ("PSTN"). For example, the network 118 serves to route calls from the phones 104 to the voicemail system components 110. In one example, the network 118 comprises a wireline network 803. The network 120 in one example comprises a signaling system 7 ("SS7") network. The networks 122 and 802 in one example comprise respective internet protocol ("IP") networks. The networks 804 and 806 in one example comprise respective wireless networks 807, for example, that comprise respective instances of a home location register ("HLR") 809. The network 804 in one example comprises a home ("H" or "h") network for the user 117. The network 806 in one example comprises a network that the user 117 visits, for example, a visited or visitation ("V" or "v") network. The network 808 in one example comprises one or more of an internet and an intranet. In one example, an administrator 107 accesses one or more of the voicemail system components 110 and/or one or more of the storage devices, for example, through an access point at one or more of the networks 106.

Figure 2:
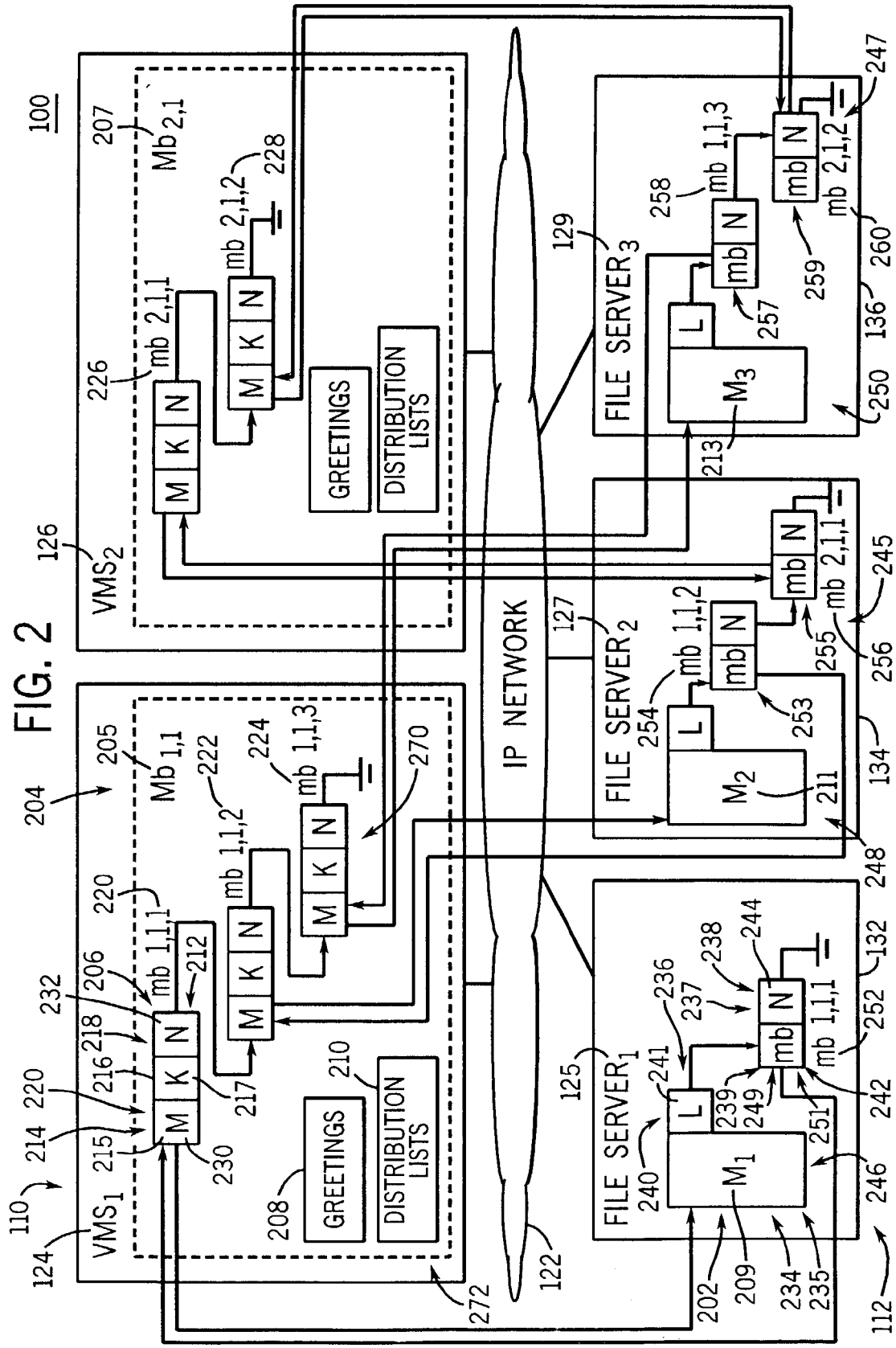
FIG. 2 is a representation of one exemplary implementation of a plurality of the voicemail system components, one of the networks, and a plurality of the storage devices of the apparatus of FIG. 1.
Figure 3:
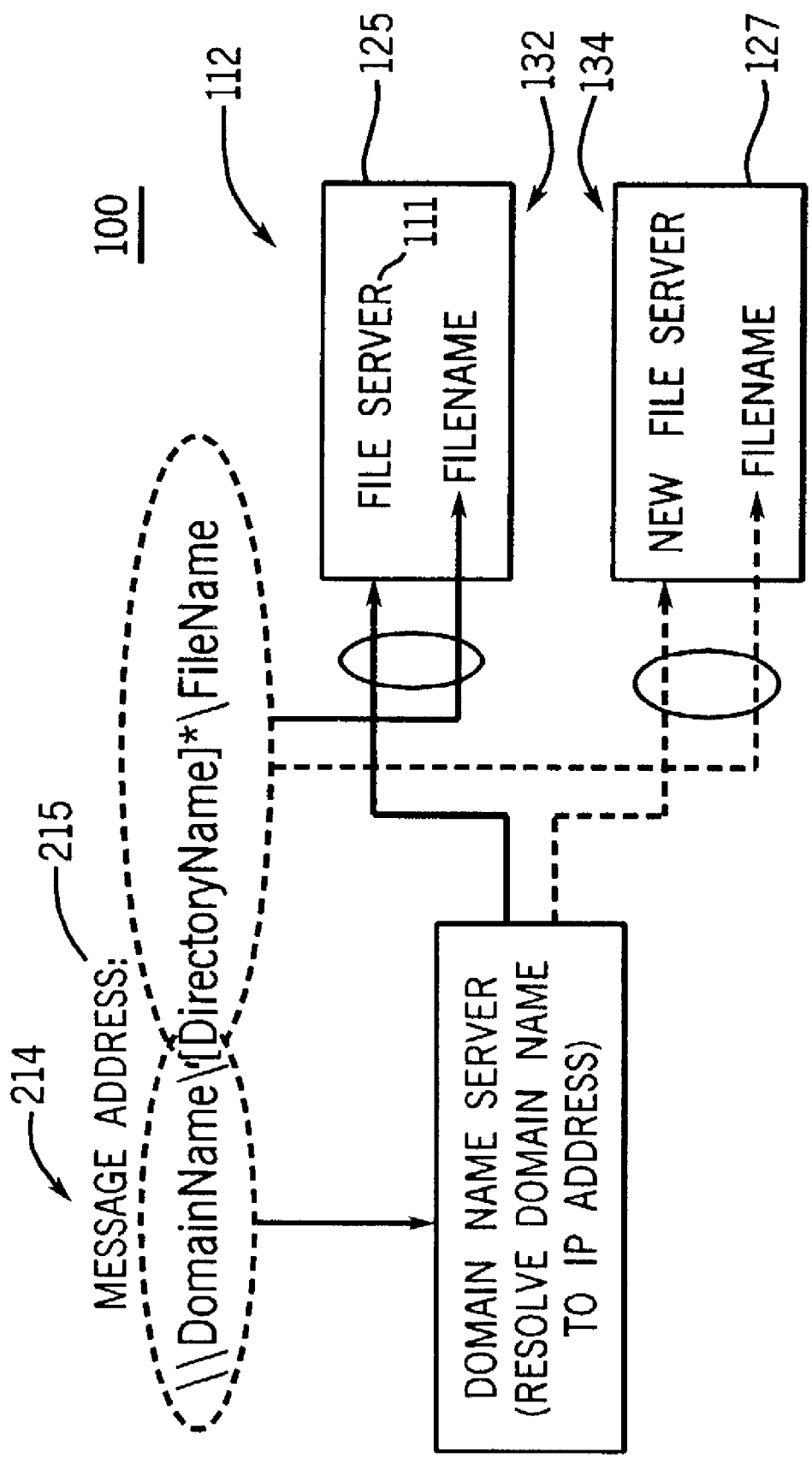
FIG. 3 is a representation of one exemplary implementation of information of an entry of one voice mailbox of one of the voicemail system components of the apparatus of FIG. 1.

Further referring to FIGS. 1 and 8, exemplary instances of the voicemail system component 110 comprise voicemail system components 124, 126, 128, 810, and 812. Referring to FIGS. 1–2 and 8, the voicemail system component 110 in one example serves to any one or more of store, modify, retrieve, forward, and delete one or more voicemail messages 202 located on the storage device 112. For example, one or more of the voicemail system components 110 employ a protocol 130 to communicate with the networks 122 and/or 802. The protocol 130 in one example comprises a transmission control protocol/internet protocol ("TCP/IP"). The storage device 112 in one example comprises a file server 111. Exemplary instances of the storage device 112 comprise storage devices 132, 134, 136, 814, 816, 818, 820, 822, 824, 826, 828, and 830. Exemplary instances of the file server 111 comprise file servers 125, 127, 129, 832, and 834. The node component 850 in one example comprises service control point ("SCP") component 852. Exemplary instances of the node component 850 comprise node components 854 and 856. Exemplary instances of the service control point component 852 comprise service control point components 858 and 860. In one example, the node component 854 and/or the service control point component 858 is associated with the network 804. In a further example, the node component 856 and/or the service control point component 860 is associated with the network 806.

Referring to FIGS. 1–2 and 8, a first one of the users 117 in one example employs the phone 104 to place a call to a second one of the users 117. Should the first one of the users 117 be unavailable to take the call, then the apparatus 100 in one example allows the second one of the users 117 to leave a voicemail message 202 that the apparatus 100 will associate with a voice mailbox 204 that the apparatus 100 provides for the second one of the users 117. The voice mailbox 204 in one example allows access to zero, one, or a plurality of voicemail messages 202, with the number of the voicemail messages 202 variable over time, for example, in response to one or more additional users 117 leaving voicemail messages 202 for the user 117 that is associated with the voice mailbox 204 and/or in response to the user 117 that is associated with the voice mailbox 204 accessing the voice mailbox 204 to perform operations on one or more of the voicemail messages 202.

Referring to FIGS. 1–2 and 8, the voicemail system component 110 in one example comprises one or more voice mailboxes 204. The voice mailbox 204 in one example serves to allow the user 117 to which the voice mailbox 204 is assigned and/or with which the voice mailbox 204 is associated, to access one or more voicemail messages 202 for the user 117. Exemplary instances of the voice mailbox 204 comprise voice mailboxes 205 and 207. Exemplary instances of the voicemail message 202 comprise voicemail messages 209, 211, and 213.

Referring to FIG. 2, the voice mailbox 204 in one example comprises zero or more entries 206, zero or more greetings 208, and zero or more distribution lists 210. Referring to FIGS. 2 and 8, one or more of the entries 206, the greeting 208, and the distribution list 210 in one example comprise a mailbox profile 836. In one example, the mailbox profile 836 comprises one or more entries 206 for the voice mailbox 204. In another example, the mailbox profile 836 comprises the entries 206 and the greeting 208 for the voice mailbox 204. In yet another example, the mailbox profile 836 comprises the entries 206 and the greeting 208 for the voice mailbox 204. In a further example, one or more of the entries 206 comprise link information 270 for the voice mailbox 204. In a still further example, one or more of the greetings 208 and/or one or more of the distribution lists 210 comprise setting information 272 for the voice mailbox 204.

Exemplary instances of the entry 206 comprise entries 220, 222, 224, 226, and 228. The entry 206 in one example comprises a linked list 212. For example, the entry 206 comprises one or more of information 214, 216, and 218.

Referring further to FIG. 2, the information 214 in one example comprises an address or reference, for example, a pointer 230 of the linked list 212. In one example, the information 214 comprises a message address 215. For example, referring to FIGS. 1–3 and 8, the message address 215 comprises a domain name, a directory name, and a file name of a file on a file server 111.

Referring to FIGS. 1–2 and 8, the pointer 230 in one example points to a location of one of the voicemail messages 202 located on the storage devices 112. For example, the pointer 230 of the entry 220 points to the location of the message 209 on the storage device 132, so the message 209 is associated with the voice mailbox 124. In a further example, the message 209 is also associated with the voice mailbox 126, so the pointer 230 of the entry 226 points to the location of the message 209 on the storage device 132.

Referring again to FIG. 2, information 216 in one example comprises an encryption key 217. The encryption key 217 in one example serves to allow the user 117 whose mailbox 204 is authorized to receive the voicemail message 202, to decrypt the voicemail message 202 when in an encrypted form, for example, for security and/or authentication purposes, as will be appreciated by those skilled in the art.

Still referring to FIG. 2, information 218 in one example comprises an address or reference, for example, a (e.g., tail) pointer 232 of the linked list 212. The pointer 232 of one of the entries 206 in the voice mailbox 204 in one example points to a location of a subsequent one of the entries 206 on the same voice mailbox 204, or in the event no subsequent entry 206 exists, the pointer 232 comprises a NULL character or the like. For example, the pointer 232 of the entry 220 points to the entry 222, the pointer 232 of the entry 222 points to the entry 224, and the pointer 232 of the entry 224 comprises a NULL character or the like.

Further referring to FIGS. 1–2 and 8, the apparatus 100 in one example employs the greeting 208 to present to a first user 117 that wishes to call a second user 117 that is unavailable at that time, a welcome, invitation, or announcement regarding the possibility of leaving a voicemail message 202 for the second user 117. In one example, each voice mailbox 204 is associated with a particular user 117, and that particular user 117 records, controls, or manages one or more of the greetings 208 for that voice mailbox 204. For example, the apparatus 100 serves to present the greeting 208 to the calling user 117 before allowing the calling user 117 to leave a voicemail message 202 for the receiving user 117.

Referring to FIGS. 1–2, the distribution list 210 in one example comprises a set of identifiers of one or more of the users 117. For example, the distribution list 210 comprises a list of one or more of the destination numbers 113 for one or more of the users 117 that the user 117 of the particular voice mailbox 204 have available for distribution of one or more of the voicemail messages 202.

Referring to FIGS. 1–2 and 8, the storage device 112 in one example comprises one or more information sets 234. The information set 234 in one example comprises a linked list 235. In one example, the information set 234 comprises one or more of the voicemail messages 202, an instance of information 236, and one or more instances of information 238. The information 236 and the information 238 in one example comprise a user list 240. For example, the information 236 comprises a start 241 of the user list 240. Exemplary instances of the user list 240 comprise user lists 243, 245, and 247. The information 238 in one example comprises an entry 249 of the user list 240. Exemplary instances of the entry 249 comprise entries 251, 253, 255, 257, and 259. In a further example, the information 238 comprises addresses 242 and 244. In one example, address 242 comprises an address or reference, for example, a pointer 239 to one of the entries 206. In a further example, address 244 comprises an address or reference, for example, a pointer 237 to a location of a subsequent one of the addresses 242, or in the event no subsequent address 242 exists, the address 244 comprises a NULL character or the like.

Referring further to FIG. 2, in one example, each instance of the information 238 of a same instance of information set 234 comprises a respective address 242 for a corresponding one of the entries 206. For example, the instances of information 238 of the information set 234 serve to identify each of the mailboxes 204 to which the apparatus 100 has allowed access to the voicemail message 202 of that information set 234. Exemplary instances of the information set 234 comprises information sets 246, 248, and 250. Exemplary instances of the address 242 comprise addresses 252, 254, 256, 258, and 260. For example, in information set 250, the address 258 identifies the location of the entry 224 in the mailbox 205, and the address 260 identifies the location of the entry 228 in the mailbox 207, where apparatus 100 has allowed the mailboxes 205 and 207 access to the voicemail message 213.

Referring to FIGS. 1 and 4–11, logic 400, 500, 600, 700, 900, 1000, and 1100 present exemplary logic that is employable in one example of the apparatus 100. The logic 400 in one example serves to allow exemplary broadcasting of the voicemail message 202, for example, through employment of one or more of exemplary STEPS 402, 404, 406, 408, and 410. The logic 500 in one example serves to allow exemplary editing of the voicemail message 202, for example, through employment of one or more of exemplary STEPS 502, 504, 506, and 508. The logic 600 in one example serves to allow exemplary deleting of the voicemail message 202, for example, through employment of one or more of exemplary STEPS 602, 604, 606, 608, 610, 612, 614, 616, 618, 620, 622, and 624. The logic 700 in one example serves to allow exemplary moving of the voice mailbox 204, for example, through employment of one or more of exemplary STEPS 702, 704, 706, 708, and 710. The logic 900 in one example serves to allow exemplary configuration of the wireless network 807 to handle the user 117, for example, through employment of one or more of exemplary STEPS 902, 904, 906, 908, 910, 912, 914, 916, and 918.

In one example of the logic 900, referring to FIGS. 1 and 8–9, an optimal location 920 in STEP 914 comprises a location on one of the voicemail system components 110 that is associated with the wireless network 807 in which the user 117 has registered in STEP 902. For example, should the user 117 in STEP 902 register with the network 806, then the optimal location 920 in STEP 914 in one example comprises a location on voicemail system component 810 or 812. In another example, should the user 117 in STEP 902 register with the network 804, then the optimal location 920 in STEP 914 in one example comprises a location on voicemail system component 124, 126, or 128. In a further example, a non-optimal location 922 in STEP 916 comprises a location on one of the voicemail system components 110 that is not associated with the wireless network 807 in which the user 117 has registered in STEP 902. For example, should the user 117 in STEP 902 register with the network 806, then the non-optimal location 922 in STEP 916 in one example comprises a location on voicemail system component 124, 126, or 128. In another example, should the user 117 in STEP 902 register with the network 804, then the non-optimal location 922 in STEP 916 in one example comprises a location on voicemail system component 810 or 812.

Referring further to FIGS. 1, 8, and 10–11, the logic 1000 in one example serves to allow exemplary handling of a call for the user 117 on the wireless network 807, for example, through employment of one or more of exemplary STEPS 1002, 1004, 1006, 1008, 1010, 1012, 1014, 1016, 1018, 1020, 1022, 1024, and 1026. The logic 1100 in one example serves to allow exemplary handling of a call for the user 117 on the wireline network 803, for example, through employment of one or more of exemplary STEPS 1102, 1104, 1106, 1108, 1110, 1112, 1114, 1116, 1118, 1120, 1122, 1124, 1126, and 1128.

Now is presented an illustrative description of exemplary operation of the apparatus 100, for explanatory purposes. Referring to FIGS. 1 and 8, in one example the user 121 attempts to place a call to the user 123. In one example, the user 121 employs the phone 114 to contact the user 123 at the phone 116, for example, by dialing or typing the destination number 115. In a further example, the apparatus 100 connects the user 121 at the phone 114 to the user 123 at the phone 116. In another example, the user 123 is not available to take the call at the phone 116. For example, the user 123 is already actively using the phone 116 when the user 121 places the call to the user 123. In a further example, the user 123 is not employing the phone 116 when the user 121 places the call to the user 123. In yet another example, the user 123 decides not to take the call from the user 123, or the user 123 decides that the user 123 does not wish to take any call or receive an interruption when the user 121 places the call to the user 123. Referring to FIGS. 1–2 and 8, when the call from the user 121 does not result in an active conversation with the user 123, the apparatus 100 in one example connects the user 121 with the voicemail system component 110 that comprises the voice mailbox 204 of the user 123, as will be appreciated by those skilled in the art.

Again referring to FIGS. 1–2 and 8, the voicemail system component 110 that comprises the voice mailbox 204 of the user 123 in one example plays the greeting 208, prompts the user 123 to record a message 202 for the user 123, and causes the voicemail message 202 for the user 123 to be stored on the storage device 112 that the apparatus 100 associates with the voice mailbox 204 of the user 123. In one example, the voicemail system component 110 that comprises the voice mailbox 204 of the user 123 serves to encrypt the voicemail message 202 for the user 123 and create the encryption key 217. In a further example, the voicemail system component 110 serves to create the entry 206 in the voice mailbox 204 of the user 123 in which the pointer 230 points to the voicemail message 202 for the user 123, and where the entry 206 further comprises the encryption key 217 and the pointer 232. For example, the voicemail system component 110 serves to add the entry 206 to the linked list 212 of the voice mailbox 204 of the user 123, or create the linked list 212 if no other entries 206 were already present in the voice mailbox 204 of the user 123. In one example of forwarding and/or broadcasting of the voicemail message 202, referring to FIGS. 1–2, 4, and 8, the apparatus 100 serves to copy the pointer 230 and the encryption key 217 in an entry 206 of each voice mailbox 204 from which the voicemail message 202 is accessible.

In a still further example, referring to FIGS. 1–2 and 8, the voicemail system component 110 serves to create and/or cause creation of the information set 234 on the storage device 112. For example, the voicemail system component 110 allows the voicemail message 202 for the user 123 to be stored on the storage device 112. The voicemail system component 110 in one example passes to the storage device 112 the location of the entry 206 in the voice mailbox 204, where the pointer 230 of that entry 206 points to the location of the voicemail message 202 on the storage device 112. In one example, the storage device 112 and the voicemail system component 110 communicate to determine the location of the voicemail message 202 on the storage device 112, where the pointer 230 comprises the address of that location. In a further example, the storage device 112 stores the location of the entry 206 in the address 242 of the information set 234 that comprises that voicemail message 202. In one example of forwarding and/or broadcasting of the voicemail message 202, referring to FIGS. 1–2, 4, and 8, the apparatus 100 serves to copy in the address 242 of respective entries 249 the respective locations of the entries 206 of the voice mailboxes 204 from which the voicemail message 202 is accessible.

Referring again to FIGS. 1–2 and 8, when the voicemail message 202 in one example is forwarded from a first voice mailbox 204 to a second voice mailbox 204, the voicemail system component 110 serves to modify and/or cause modification of the information set 234 on the storage device 112, for example, by adding an entry 249 to the linked list 235 for the voicemail message 202 on the storage device 112 which the apparatus 100 associates with the second voice mailbox 204 in addition to the entry 249 already present in the linked list 235 which the apparatus 100 has already associated with the first voice mailbox 204.

Referring to FIGS. 1–2 and 8, the user 117 in one example accesses the voice mailbox 204 that the apparatus 100 associates with that user 117. For example, the user 117 dials the destination number 113 for that user 117 from the phone 104. In a further example, the user 117 provides a password or other form of authentication to the voicemail system component 110 to gain access to the voice mailbox 204 of that user 117. Upon gaining access to the voice mailbox 204, the user 117 in one example instructs the voicemail system component 110 to retrieve one of the one or more voicemail messages 202 to which the apparatus 100 allows access through the voice mailbox 204. The voicemail system component 110 in one example employs the entry 206 in the voice mailbox 204 that corresponds to the voicemail message 202 on the storage device 112, to allow access to the voicemail message 202 by the user 117.

Further referring to FIGS. 1–2 and 4, the user 117 in one example employs one or more portions of the logic 400 to broadcast the voicemail message 202. Broadcasting of the voicemail message 202 in one example comprises forwarding of the voicemail message 202 to multiple users 117. In one example, broadcasting of the voicemail message 202 comprises forwarding of the voicemail message 202 to all users 117 listed on one or more of the distribution lists 210.

Again referring to FIGS. 1–2 and 5, the user 117 in one example employs one or more portions of the logic 500 to edit the voicemail message 202. In one example, the editing of the voicemail message 202 applies to the voicemail message 202 that the user 117 associated with the voice mailbox 204 has been broadcast to multiple users 117. In another example, the editing of the voicemail message 202 analogously applies to the voicemail message 202 that the user 117 associated with the voice mailbox 204 has forwarded to one other user 117, as will be appreciated by those skilled in the art.

For example, referring to FIGS. 1–2 and 5, the user 117 that has sent a voicemail message 202 in one example modifies and/or edits the voicemail message 202. Referring to FIGS. 1–2, 5, and 8, the voicemail system component 110 in one example serves to identify the user 117 as having sent the voicemail message 202 and cooperates with the storage device 112 to allow the user 117 to substitute a replacement voicemail message 202 for the existing voicemail message 202. In the event a user 117 that previously received access to the existing voicemail message 202 already did access the existing voicemail message 202, then the apparatus 100 in one example serves to make the replacement voicemail message 202 accessible to that user 117 as a new voicemail message 202.

In yet another example, referring to FIGS. 1–2 and 6, the user 117 employs one or more portions of the logic 600 to delete the voicemail message 202 from the voice mailbox 204 of that user 117, which in one example comprises deletion of the entry 206 for that voicemail message 202 and a deletion of the corresponding entry 249 of the user list 240. For example, referring to FIGS. 1–2, 6, and 8, upon deletion by a user 117 of the entry 206 for the voicemail message 202 from the voice mailbox 204 of that user 117, the storage device 112 that stores the voicemail message 202 performs a check of the information set 234 to determine whether the apparatus 100 has associated any additional voice mailboxes 204 with the voicemail message 202. In one example, the storage device 112 determines whether any additional entries 249 exist for the voicemail message 202, which in one example serve to indicate that the apparatus 100 has associated additional voice mailboxes 204 with the voicemail message 202. If so, then the storage device 112 continues to store the voicemail message 202. If not, then the storage device 112 deletes the voicemail message 202. Deletion of the voicemail message 202 from the storage device 112 in one example comprises deletion of the information set 234 that comprises that voicemail message 202.

In a further example, referring to FIGS. 1–2 and 7–8, the administrator 107 employs one or more portions of the logic 700 to move the voice mailbox 204 from one of the storage devices 112 to another of the storage devices 112. In one example, the apparatus 100 in one example serves to allow the administrator 107 to move one or more of the voice mailboxes 204 among a plurality of the voicemail system components 110. For example, the apparatus 100 in one example allows the administrator 107 to move the voice mailbox 204 from a first voicemail system component 110 to a second voicemail system component 10. Moving of the one or more voice mailboxes 204 in one example serves to balance the load among the one or more voicemail system components 110, for example, of participation in the handling and/or managing of one or more of the voice mailboxes 204. In another example, moving of the one or more voice mailboxes 204 serves to promote efficiency and/or effectiveness of one or more of the voicemail system components 110.

Referring to FIGS. 1–2 and 7–8, a first voicemail system component 110 in one example creates a second voice mailbox 204 on a second voicemail system component 110 to accomplish the move of a first voice mailbox 204. For example, the first voicemail system component 110 copies the one or more entries 206, the one or more greetings 208, and the one or more distribution lists 210 from the first voice mailbox 204 to the second voice mailbox 204. In a further example, the first voicemail system component 110 cooperates with one or more of the storage devices 112 to cause an updating of one or more of the entries 249, for example, to update the addresses 242 to point to locations of the one or more entries 206 in the second voice mailbox 204 rather than locations of the one or more entries 206 in the first voice mailbox 204. In a still further example, the first voicemail system component 110 serves to delete the one or more entries 206, the one or more greetings 208, and the one or more distribution lists 210 from the first voice mailbox 204.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
one or more voicemail system components that employ an internet protocol network to store or access one or more voicemail messages on one or more storage devices, wherein the one or more voicemail system components are coupled with the one or more storage devices through the internet protocol network;
wherein the one or more voicemail system components comprise a first voice mailbox and a second voice mailbox;
wherein the first voice mailbox comprises an address of a location on a storage device, of the one or more storage devices;
wherein the second voice mailbox comprises the address;
wherein the address is employable by the one or more voicemail system components to access a voicemail message, of the one or more voicemail messages, on the storage device;
the apparatus in combination with the one or more storage devices, wherein the storage device of the one or more storage devices comprises one or more linked lists that are associated with the voicemail message of the one or more voicemail messages on the storage device of the one or more storage devices;
wherein the one or more linked lists comprise the address of the location on one or more of the one or more voicemail system components;
wherein the location corresponds to one or more of the first voice mailbox and the second voice mailbox on the one or more of the one or more voicemail system components; and
wherein the one or more of the first voice mailbox and the second voice mailbox are associated with one or more intended recipients of the voicemail message of the one or more voicemail messages;
wherein the storage device of the one or more storage devices serves to delete the voicemail message of the one or more voicemail messages upon deletion of a reference to the voicemail message from each of the first voice mailbox and the second voice mailbox.

2. The apparatus of claim 1, wherein a voicemail system component, of the one or more voicemail system components, employs the address of the location on the storage device, of the one or more storage devices, to store or access the voicemail message, of the one or more voicemail messages, on the storage device.

3. The apparatus of claim 1 in combination with the one or more storage devices, wherein the one or more voicemail system components comprise a voicemail system component, wherein the storage device of the one or more storage devices employs the address of the location on the voicemail system component of the one or more voicemail system components to identify one or more of the first voice mailbox and the second voice mailbox on the voicemail system component;
wherein the one or more of the first voice mailbox and the second voice mailbox correspond to the voicemail message, of the one or more voicemail messages, that is located on the storage device.

4. The apparatus of claim 1 in combination with the one or more storage devices, wherein the one or more voicemail system components comprise a plurality of voicemail system components, wherein the one or more storage devices comprise a plurality of file servers;

wherein a first voicemail system component of the plurality of voicemail system components employs the internet protocol network to store and access a first voicemail message, of the one or more voicemail messages, on a file server of the plurality of file servers;

wherein a second voicemail system component of the plurality of voicemail system components employs the internet protocol network to store and access a second voicemail message, of the one or more voicemail messages, on a file server of the plurality of file servers.

5. The apparatus of claim 1, wherein the one or more voicemail system components employ the internet protocol network to any one or more of store, modify, retrieve, forward, and delete the one or more voicemail messages on the one or more storage devices.

6. The apparatus of claim 1 in combination with the one or more storage devices, wherein the one or more voicemail messages are located on the one or more storage devices, wherein the one or more voicemail system components comprise one or more pointers to the one or more voicemail messages.

7. The apparatus of claim 1, wherein upon modification of the voicemail message to comprise a modified voicemail message, the address serves to allow access to the modified voicemail message from one or more of the first voice mailbox and the second voice mailbox through employment of the address.

8. The apparatus of claim 1, wherein one or more of the first voice mailbox and the second voice mailbox comprise one or more linked lists;

wherein the one or more linked lists comprise the address of the location on the storage device of the one or more storage devices; and wherein the one or more of the one or more voicemail system components employ one or more of the one or more linked lists to access the voicemail message of the one or more voicemail messages on of the storage device of the one or more storage devices.

9. The apparatus of claim 8, wherein the one or more of the one or more linked lists comprise an encryption key that serves to allow access to the voicemail message of the one of more voicemail messages.

10. The apparatus of claim 1, wherein forwarding of the voicemail message of the one or more voicemail messages from the first voice mailbox to the second voice mailbox on the one or more voicemail system components comprises copying of the address of the voicemail message from the first voice mailbox to the second voice mailbox.

11. The apparatus of claim 1, wherein the one or more voicemail system components comprise a first voicemail system component and a second voicemail system component, wherein the address of the location on the storage device comprises a first address of a first location on a first storage device;

wherein the first voicemail system component moves the first mailbox from the first address of the first location on the first storage device to a second address of a second location on a second storage device of the second voicemail system component.

12. The apparatus of claim 11, wherein a movement by the first voicemail system component of the first mailbox from the first address of the first location on the first storage device to the second address of the second location on the second storage device of the second voicemail system component serves to promote efficiency and effectiveness of the first voicemail system component and the second voicemail system component.

13. A method, comprising the step of:

copying an address of a voicemail message on a second voice mailbox, on a second voicemail system component, from a first voice mailbox, on a first voicemail system component, to move an association with a user from the first voice mailbox to the second voice mailbox, wherein the first and second voicemail system components are coupled with a storage device through an internet protocol network;

wherein the step of copying the address of the voicemail message on the second voice mailbox comprises the step of:

changing on the storage device a correspondence of the voicemail message from the first voice mailbox to the second voice mailbox.

14. The method of claim 13, further comprising the step of:

employing the internet protocol network to any one or more of store, modify, retrieve, forward, and delete the voicemail message on the storage device.

15. The method of claim 13, wherein the first voice mailbox comprises an encryption key, wherein the step of copying the address of the voicemail message on the second voice mailbox comprises the steps of:

copying the encryption key with the address of the voicemail message on the second voice mailbox; and allowing access to the voicemail message on the second voice mailbox through employment of the encryption key.

16. An article, comprising:

a computer-readable signal-bearing medium; and means in the medium for copying an address of a voicemail message on a second voice mailbox, on a second voicemail system component, from a first voice mailbox, on a first voicemail system component, to move an association with a user from the first voice mailbox to the second voice mailbox, wherein the first and second voicemail system components are coupled with a storage device through an internet protocol network;

wherein the means in the medium for copying the address of the voicemail message on the second voice mailbox comprises:

means in the medium for changing on the storage device a correspondence of the voicemail message from the first voice mailbox to the second voice mailbox.

17. An apparatus, comprising:

one or more voicemail system components that employ an internet protocol network to store or access one or more voicemail messages on one or more storage devices, wherein the one or more voicemail system components are coupled with the one or more storage devices through the internet protocol network;

wherein the one or more voicemail system components comprise a first voice mailbox and a second voice mailbox;

wherein the first voice mailbox comprises an address of a location on a storage device, of the one or more storage devices, wherein the location oh the storage device stores a voicemail message of the one or more voicemail messages;

wherein the second voice mailbox comprises the address of the location on the storage device;

wherein the first voice mailbox employs the address to access the voicemail message at the location on the storage device, wherein the second voice mailbox employs the address to access the voicemail message at the location on the storage device;

wherein the address comprises a domain name, a directory name, and a file name of the voicemail message in the storage device;

wherein the storage device stores an only copy of the voicemail message, wherein the voicemail message is not duplicated to either the first voice mailbox or the second voice mailbox;

wherein the storage device serves to delete the voicemail message upon deletion of a reference to the voicemail message from each of the first voice mailbox and the second voice mailbox.

18. The apparatus of claim 17, wherein the first voice mailbox is associated with an intended recipient of the voicemail message;

wherein the second voice mailbox is passed the address of the location on the storage device to allow the second voice mailbox to access the voice message stored at the location on the storage device.

19. The apparatus of claim 18, wherein both the first voice mailbox and the second voice mailbox access the only copy of the voice message stored at the location on the storage device.

20. The apparatus of claim 17, wherein the first voice mailbox accesses the voicemail message in the storage device over the internet protocol network without going through any other mailbox;

wherein the second voice mailbox accesses the voicemail message in the storage device over the internet protocol network without going through any other mailbox.

21. An apparatus, comprising:

a first voice mailbox that employs an address of a location on a storage device to access, over an internet protocol network, a voicemail message stored at the location on the storage device; and a second voice mailbox that employs the address of the location on the storage device to access, over the internet protocol network, the voicemail message stored at the location on the storage device;

wherein the address comprises a domain name, a directory name, and a file name of the voicemail message in the storage device;

wherein the storage device stores an only copy of the voicemail message, wherein the voicemail message is not duplicated to either the first voice mailbox or the second voice mailbox;

wherein the storage device serves to delete the voicemail message upon deletion of a reference to the voicemail message from each of the first voice mailbox and the second voice mailbox.

22. The apparatus of claim 21, wherein both the first voice mailbox and the second voice mailbox access the only copy of the voice message stored at the location on the storage device.

23. The apparatus of claim 21, wherein the first voice mailbox maintains a first linked list of pointers to one or more messages stored on the storage device, wherein the second voice mailbox maintains a second linked list of pointers to one or more messages stored on the storage device;

wherein each of the first and second linked lists of pointers comprise a pointer to the voice message, wherein the pointer to the yoke message comprises the address of the location on the storage device.

24. The apparatus of claim 23, wherein upon a user deletion of the voice message from the first mailbox, the first voice mailbox deletes the pointer to the voice message from the first linked list.

25. The apparatus of claim 24, wherein upon user deletion of the voice message from both the first and second mailboxes, the storage device deletes the voice message.

26. The apparatus of claim 21, wherein the first and second voice mailboxes may employ the internet protocol network to one or more of store, modify, retrieve, forward, and/or delete the voicemail message on the one or more storage devices.

27. The apparatus of claim 21, wherein the first voice mailbox may modify the voicemail message to create a modified voicemail message, wherein the modified voicemail message is stored at the location on the storage device;

wherein the second voice mailbox accesses the modified voicemail message through employment of the address of the location on the storage device.

28. The apparatus of claim 21, wherein forwarding the voicemail message from the first voice mailbox to the second voice mailbox comprises adding a pointer to a linked list of pointers in the second voice mailbox;

wherein the pointer comprises the address of the location of the voicemail message on the storage device, wherein the second voice mailbox employs the pointer to access, over the internet protocol network, the voicemail message on the storage device.

29. The apparatus of claim 21, wherein the first voice mailbox accesses the voicemail message in the storage device over the internet protocol network without going through any other mailbox;

wherein the second voice mailbox accesses the voicemail message in the storage device over the internet protocol network without going through any other mailbox.

* * * * *